United States Patent
Caillat (10) Patent No.: US 8,950,206 B2
(45) Date of Patent: Feb. 10, 2015

(54) COMPRESSOR ASSEMBLY HAVING ELECTRONICS COOLING SYSTEM AND METHOD

(75) Inventor: Jean-Luc M. Caillat, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 847 days.

(21) Appl. No.: 12/244,387

(22) Filed: Oct. 2, 2008

(65) Prior Publication Data

US 2009/0090113 A1 Apr. 9, 2009

Related U.S. Application Data

(60) Provisional application No. 60/998,047, filed on Oct. 5, 2007.

(51) Int. Cl.
| | |
|---|---|
| *F25B 41/00* | (2006.01) |
| *F04B 53/08* | (2006.01) |
| *F04B 39/06* | (2006.01) |
| *F25B 31/00* | (2006.01) |
| *F04B 49/10* | (2006.01) |
| *F25B 13/00* | (2006.01) |

(52) U.S. Cl.
CPC ..... *F25B 31/006* (2013.01); *F25B 2700/21151* (2013.01); *F04B 53/08* (2013.01); *F04B 39/06* (2013.01); *F25B 2600/2513* (2013.01); *F25B 2600/0253* (2013.01); *F04B 2205/10* (2013.01); *F25B 2600/21* (2013.01); *Y02B 30/741* (2013.01); *F25B 2600/021* (2013.01); *F25B 13/00* (2013.01); *F04B 49/10* (2013.01)
USPC ............... 62/259.2; 62/224; 62/225; 62/513; 417/366; 361/679.54

(58) Field of Classification Search
USPC ......... 62/224, 225, 513, 259.2; 417/336, 366; 361/679.46, 679.47, 679.53, 679.54
See application file for complete search history.

(56) References Cited

U.S. PATENT DOCUMENTS

| | | | |
|---|---|---|---|
| 2,883,255 | A | 4/1959 | Anderson |
| 2,981,076 | A | 4/1961 | Gaugler |
| 3,242,321 | A | 3/1966 | Chope |

(Continued)

FOREIGN PATENT DOCUMENTS

| | | |
|---|---|---|
| CN | 1697954 A | 11/2005 |
| CN | 1806478 A | 7/2006 |

(Continued)

OTHER PUBLICATIONS

International Search Report regarding International Application No. PCT/US2008/011464 dated Mar. 13, 2009.

(Continued)

*Primary Examiner* — Cheryl J Tyler
*Assistant Examiner* — Jonathan Bradford
(74) *Attorney, Agent, or Firm* — Harness, Dickey & Pierce, P.L.C.

(57) ABSTRACT

A system, compressor, and method that cools an electronics module with a low-pressure refrigerant. The system, compressor, and method utilize a temperature sensor that detects a temperature of the low pressure refrigerant and communicates with the electronics module. Based on the temperature detected by the temperature sensor, the electronics module controls a liquid dry out point of the refrigerant that is used to cool the electronics module.

20 Claims, 3 Drawing Sheets

(56) References Cited

U.S. PATENT DOCUMENTS

| | | |
|---|---|---|
| 3,600,657 A | 8/1971 | Pfaff et al. |
| 4,130,997 A | 12/1978 | Hara et al. |
| 4,280,910 A | 7/1981 | Baumann |
| 4,370,564 A | 1/1983 | Matsushita |
| 4,460,861 A | 7/1984 | Rosa |
| 4,461,153 A | 7/1984 | Lindner et al. |
| 4,527,399 A | 7/1985 | Lord |
| 4,653,280 A | 3/1987 | Hansen et al. |
| 4,750,338 A | 6/1988 | Hingst |
| 4,940,929 A | 7/1990 | Williams |
| 5,056,712 A | 10/1991 | Enck |
| 5,182,918 A | 2/1993 | Manz et al. |
| 5,258,901 A | 11/1993 | Fraidlin |
| 5,269,146 A | 12/1993 | Kerner |
| 5,291,115 A | 3/1994 | Ehsani |
| 5,315,214 A | 5/1994 | Lesea |
| 5,347,467 A | 9/1994 | Staroselsky et al. |
| 5,359,276 A | 10/1994 | Mammano |
| 5,359,281 A | 10/1994 | Barrow et al. |
| 5,410,221 A | 4/1995 | Mattas et al. |
| 5,410,235 A | 4/1995 | Ehsani |
| 5,440,218 A | 8/1995 | Oldenkamp |
| 5,502,970 A * | 4/1996 | Rajendran .................. 62/115 |
| 5,519,300 A | 5/1996 | Leon et al. |
| 5,603,222 A | 2/1997 | Dube |
| 5,603,227 A | 2/1997 | Holden et al. |
| 5,646,499 A | 7/1997 | Doyama et al. |
| 5,663,627 A | 9/1997 | Ogawa |
| 5,712,551 A | 1/1998 | Lee |
| 5,712,802 A | 1/1998 | Kumar et al. |
| 5,742,103 A | 4/1998 | Ashok |
| 5,786,992 A | 7/1998 | Vinciarelli et al. |
| 5,903,138 A | 5/1999 | Hwang et al. |
| 5,960,207 A | 9/1999 | Brown |
| 5,963,442 A | 10/1999 | Yoshida et al. |
| 6,005,365 A | 12/1999 | Kaneko et al. |
| 6,028,406 A | 2/2000 | Birk |
| 6,035,653 A | 3/2000 | Itoh et al. |
| 6,041,609 A * | 3/2000 | Hornsleth et al. ........... 62/259.2 |
| 6,065,298 A | 5/2000 | Fujimoto |
| 6,073,457 A | 6/2000 | Kampf et al. |
| 6,091,215 A | 7/2000 | Lovett et al. |
| 6,091,233 A | 7/2000 | Hwang et al. |
| 6,102,665 A | 8/2000 | Centers et al. |
| 6,116,040 A * | 9/2000 | Stark ........................... 62/259.2 |
| 6,123,146 A | 9/2000 | Dias |
| 6,222,746 B1 | 4/2001 | Kim |
| 6,226,998 B1 | 5/2001 | Reason et al. |
| 6,236,183 B1 | 5/2001 | Schroeder |
| 6,236,193 B1 | 5/2001 | Paul |
| 6,259,614 B1 | 7/2001 | Ribarich et al. |
| 6,281,656 B1 | 8/2001 | Masaki et al. |
| 6,281,658 B1 | 8/2001 | Han et al. |
| 6,316,918 B1 | 11/2001 | Underwood et al. |
| 6,326,750 B1 | 12/2001 | Marcinkiewicz |
| 6,344,725 B2 | 2/2002 | Kaitani et al. |
| 6,370,888 B1 | 4/2002 | Grabon |
| 6,373,200 B1 | 4/2002 | Nerone et al. |
| 6,396,229 B1 | 5/2002 | Sakamoto et al. |
| 6,404,154 B2 | 6/2002 | Marcinkiewicz et al. |
| 6,406,265 B1 | 6/2002 | Hahn et al. |
| 6,414,462 B2 | 7/2002 | Chong |
| 6,446,618 B1 | 9/2002 | Hill |
| 6,462,492 B1 | 10/2002 | Sakamoto et al. |
| 6,471,486 B1 | 10/2002 | Centers et al. |
| 6,523,361 B2 | 2/2003 | Higashiyama |
| 6,539,734 B1 | 4/2003 | Weyna |
| 6,583,593 B2 | 6/2003 | Iijima et al. |
| 6,636,011 B2 | 10/2003 | Sadasivam et al. |
| 6,670,784 B2 | 12/2003 | Odachi et al. |
| 6,688,124 B1 * | 2/2004 | Stark et al. .................. 62/222 |
| 6,698,217 B2 | 3/2004 | Tanimoto et al. |
| 6,708,507 B1 | 3/2004 | Sem et al. |
| 6,714,425 B2 | 3/2004 | Yamada et al. |
| 6,735,284 B2 | 5/2004 | Cheong et al. |
| 6,749,404 B2 | 6/2004 | Gennami et al. |
| 6,753,670 B2 | 6/2004 | Kadah |
| 6,756,753 B1 | 6/2004 | Marcinkiewicz |
| 6,756,757 B2 | 6/2004 | Marcinkiewicz et al. |
| 6,758,050 B2 | 7/2004 | Jayanth et al. |
| 6,767,851 B1 | 7/2004 | Rokman et al. |
| 6,788,024 B2 | 9/2004 | Kaneko et al. |
| 6,815,925 B2 | 11/2004 | Chen et al. |
| 6,825,637 B2 | 11/2004 | Kinpara et al. |
| 6,828,751 B2 | 12/2004 | Sadasivam et al. |
| 6,831,439 B2 | 12/2004 | Won et al. |
| 6,876,171 B2 | 4/2005 | Lee |
| 6,915,646 B2 | 7/2005 | Kadle et al. |
| 6,955,039 B2 | 10/2005 | Nomura et al. |
| 6,966,759 B2 | 11/2005 | Hahn et al. |
| 6,967,851 B2 | 11/2005 | Yang et al. |
| 6,982,533 B2 | 1/2006 | Seibel et al. |
| 6,984,948 B2 | 1/2006 | Nakata et al. |
| 7,005,829 B2 | 2/2006 | Schnetzka |
| 7,049,774 B2 | 5/2006 | Chin et al. |
| 7,095,208 B2 | 8/2006 | Kawaji et al. |
| 7,096,681 B2 * | 8/2006 | Wills et al. .................. 62/175 |
| 7,138,777 B2 | 11/2006 | Won et al. |
| 7,154,237 B2 | 12/2006 | Welchko et al. |
| 7,176,644 B2 | 2/2007 | Ueda et al. |
| 7,184,902 B2 | 2/2007 | El-Ibiary |
| 7,208,895 B2 | 4/2007 | Marcinkiewicz et al. |
| 7,234,305 B2 | 6/2007 | Nomura et al. |
| 7,272,018 B2 | 9/2007 | Yamada et al. |
| 7,307,401 B2 | 12/2007 | Gataric et al. |
| 7,342,379 B2 | 3/2008 | Marcinkiewicz et al. |
| 7,375,485 B2 | 5/2008 | Shahi et al. |
| 7,458,223 B2 | 12/2008 | Pham |
| 7,554,271 B2 | 6/2009 | Thiery et al. |
| 7,580,272 B2 | 8/2009 | Taguchi et al. |
| 7,595,613 B2 | 9/2009 | Thompson et al. |
| 7,605,570 B2 | 10/2009 | Liu et al. |
| 7,613,018 B2 | 11/2009 | Lim et al. |
| 7,660,139 B2 | 2/2010 | Garabandic |
| 7,667,986 B2 | 2/2010 | Artusi et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,723,964 B2 | 5/2010 | Taguchi |
| 7,733,678 B1 | 6/2010 | Notohamiprodjo et al. |
| 7,738,228 B2 | 6/2010 | Taylor |
| 7,782,033 B2 | 8/2010 | Turchi et al. |
| 7,821,237 B2 | 10/2010 | Melanson |
| 7,895,003 B2 | 2/2011 | Caillat |
| 2001/0022939 A1 * | 9/2001 | Morita et al. ............... 417/366 |
| 2002/0047635 A1 | 4/2002 | Ribarich et al. |
| 2002/0062656 A1 * | 5/2002 | Suitou et al. ................ 62/259.2 |
| 2002/0103384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 | 1/2003 | Rossi et al. |
| 2003/0077179 A1 | 4/2003 | Collins et al. |
| 2003/0085621 A1 | 5/2003 | Potega |
| 2003/0094004 A1 | 5/2003 | Pham et al. |
| 2003/0146290 A1 | 8/2003 | Wang et al. |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0119434 A1 | 6/2004 | Dadd |
| 2004/0183491 A1 | 9/2004 | Sidey |
| 2004/0221594 A1 | 11/2004 | Suzuki et al. |
| 2005/0047179 A1 | 3/2005 | Lesea |
| 2005/0115257 A1 * | 6/2005 | Goth et al. .................. 62/186 |
| 2005/0204760 A1 | 9/2005 | Kurita et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0247073 A1 | 11/2005 | Hikawa et al. |
| 2005/0262849 A1 | 12/2005 | Nomura et al. |

(56) References Cited

U.S. PATENT DOCUMENTS

| | | |
|---|---|---|
| 2005/0270814 A1 | 12/2005 | Oh |
| 2006/0041335 A9 | 2/2006 | Rossi et al. |
| 2006/0042276 A1 | 3/2006 | Doll et al. |
| 2006/0048530 A1 | 3/2006 | Jun et al. |
| 2006/0056210 A1 | 3/2006 | Yamada et al. |
| 2006/0090490 A1 | 5/2006 | Grimm et al. |
| 2006/0117773 A1 | 6/2006 | Street et al. |
| 2006/0123809 A1 | 6/2006 | Ha et al. |
| 2006/0130501 A1 | 6/2006 | Singh et al. |
| 2006/0150651 A1 | 7/2006 | Goto et al. |
| 2006/0158912 A1 | 7/2006 | Wu et al. |
| 2006/0185373 A1 | 8/2006 | Butler et al. |
| 2006/0187693 A1 | 8/2006 | Tang |
| 2006/0198172 A1 | 9/2006 | Wood |
| 2006/0198744 A1 | 9/2006 | Lifson et al. |
| 2006/0255772 A1 | 11/2006 | Chen |
| 2006/0261830 A1 | 11/2006 | Taylor |
| 2006/0290302 A1 | 12/2006 | Marcinkiewicz et al. |
| 2007/0012052 A1 | 1/2007 | Butler et al. |
| 2007/0029987 A1 | 2/2007 | Li |
| 2007/0040524 A1 | 2/2007 | Sarlioglu et al. |
| 2007/0040534 A1 | 2/2007 | Ghosh et al. |
| 2007/0089424 A1 | 4/2007 | Venkataramani et al. |
| 2007/0118307 A1 | 5/2007 | El-Ibiary |
| 2007/0118308 A1 | 5/2007 | El-Ibiary |
| 2007/0132437 A1 | 6/2007 | Scollo et al. |
| 2007/0144354 A1 | 6/2007 | Muller et al. |
| 2008/0089792 A1 | 4/2008 | Bae et al. |
| 2008/0112823 A1 | 5/2008 | Yoshida et al. |
| 2008/0143289 A1 | 6/2008 | Marcinkiewicz et al. |
| 2008/0160840 A1 | 7/2008 | Bax et al. |
| 2008/0209925 A1 | 9/2008 | Pham |
| 2008/0216494 A1 | 9/2008 | Pham et al. |
| 2008/0232065 A1 | 9/2008 | Lang et al. |
| 2008/0252269 A1 | 10/2008 | Feldtkeller et al. |
| 2008/0265847 A1 | 10/2008 | Woo et al. |
| 2008/0272745 A1 | 11/2008 | Melanson |
| 2008/0272747 A1 | 11/2008 | Melanson |
| 2008/0273356 A1 | 11/2008 | Melanson |
| 2008/0284399 A1 | 11/2008 | Oettinger et al. |
| 2008/0285318 A1 | 11/2008 | Tan et al. |
| 2009/0015214 A1 | 1/2009 | Chen |
| 2009/0015225 A1 | 1/2009 | Turchi et al. |
| 2009/0016087 A1 | 1/2009 | Shimizu |
| 2009/0033296 A1 | 2/2009 | Hammerstrom |
| 2009/0039852 A1 | 2/2009 | Fishelov et al. |
| 2009/0059625 A1 | 3/2009 | Viitanen et al. |
| 2009/0071175 A1 | 3/2009 | Pham |
| 2009/0091961 A1 | 4/2009 | Hsia et al. |
| 2009/0094997 A1 | 4/2009 | McSweeney |
| 2009/0140680 A1 | 6/2009 | Park |
| 2009/0237963 A1 | 9/2009 | Prasad et al. |
| 2009/0243561 A1 | 10/2009 | Tan et al. |
| 2009/0273330 A1 | 11/2009 | Sisson |
| 2009/0290395 A1 | 11/2009 | Osaka |
| 2009/0295347 A1 | 12/2009 | Popescu et al. |
| 2009/0303765 A1 | 12/2009 | Shimizu et al. |
| 2009/0316454 A1 | 12/2009 | Colbeck et al. |
| 2010/0007317 A1 | 1/2010 | Yang |
| 2010/0014326 A1 | 1/2010 | Gu et al. |
| 2010/0014329 A1 | 1/2010 | Zhang et al. |
| 2010/0052601 A1 | 3/2010 | Pummer |
| 2010/0052641 A1 | 3/2010 | Popescu et al. |
| 2010/0079125 A1 | 4/2010 | Melanson et al. |
| 2010/0080026 A1 | 4/2010 | Zhang |
| 2010/0109615 A1 | 5/2010 | Hwang et al. |
| 2010/0109626 A1 | 5/2010 | Chen |
| 2010/0118571 A1 | 5/2010 | Saint-Pierre |
| 2010/0118576 A1 | 5/2010 | Osaka |
| 2010/0128503 A1 | 5/2010 | Liu et al. |
| 2010/0156377 A1 | 6/2010 | Siegler |
| 2010/0165683 A1 | 7/2010 | Sugawara |
| 2010/0181930 A1 | 7/2010 | Hopwood et al. |
| 2010/0187914 A1 | 7/2010 | Rada et al. |
| 2010/0202169 A1 | 8/2010 | Gaboury et al. |
| 2010/0226149 A1 | 9/2010 | Masumoto |
| 2010/0246220 A1 | 9/2010 | Irving et al. |
| 2010/0246226 A1 | 9/2010 | Ku et al. |
| 2010/0253307 A1 | 10/2010 | Chen et al. |
| 2010/0259230 A1 | 10/2010 | Boothroyd |
| 2010/0270984 A1 | 10/2010 | Park et al. |
| 2012/0279251 A1 | 11/2012 | Kido et al. |

FOREIGN PATENT DOCUMENTS

| | | |
|---|---|---|
| EP | 1209362 A2 | 5/2002 |
| EP | 1541869 A1 | 6/2005 |
| JP | 55155134 A | 12/1980 |
| JP | 61272483 A | 12/1986 |
| JP | 01167556 | 7/1989 |
| JP | 2004163 A | 1/1990 |
| JP | 03129255 A | 6/1991 |
| JP | 04344073 A | 11/1992 |
| JP | H05322224 A | 12/1993 |
| JP | H06159738 | 6/1994 |
| JP | 07035393 A | 2/1995 |
| JP | H0926246 A | 1/1997 |
| JP | 09196524 A | 7/1997 |
| JP | 10009683 | 1/1998 |
| JP | 10153353 A | 6/1998 |
| JP | 10160271 | 6/1998 |
| JP | H1123075 | 1/1999 |
| JP | 11159895 A | 6/1999 |
| JP | 11287497 A | 10/1999 |
| JP | 2000205630 A | 7/2000 |
| JP | 2001317470 A | 11/2001 |
| JP | 2002013858 A | 1/2002 |
| JP | 2002243246 A | 8/2002 |
| JP | 2003156244 | 5/2003 |
| JP | 2004069295 A | 3/2004 |
| JP | 2004135491 A | 4/2004 |
| JP | 2005-003710 A | 1/2005 |
| JP | 2005132167 A | 5/2005 |
| JP | 2005282972 A | 10/2005 |
| JP | 2006177214 A | 7/2006 |
| JP | 2006188954 | 7/2006 |
| JP | 2006233820 | 9/2006 |
| JP | 2007198230 A | 8/2007 |
| JP | 2007198705 A | 8/2007 |
| JP | 2009264699 A | 11/2009 |
| JP | 2010266132 A | 11/2010 |
| JP | 2011033340 A | 2/2011 |
| KR | 10-1996-0024115 | 7/1996 |
| KR | 2001-0044273 A | 6/2001 |
| KR | 2003-0011415 A | 2/2003 |
| KR | 20050085544 A | 8/2005 |
| KR | 20070071407 A | 7/2007 |
| WF | WO-9913225 A1 | 3/1999 |
| WO | WO-9702729 A1 | 1/1997 |
| WO | WO-2004059822 A1 | 7/2004 |
| WO | WO-2004083744 A1 | 9/2004 |
| WO | WO-2005101939 A1 | 10/2005 |
| WO | WO-2009048566 A3 | 5/2009 |
| WO | WO-2011083756 A1 | 7/2011 |

OTHER PUBLICATIONS

Written Opinion of the International Searching Authority regarding International Application No. PCT/US2008/011464 dated Mar. 13, 2009.

International Search Report regarding International Application No. PCT/US2008/011576 dated Mar. 23, 2009.

Written Opinion of the International Searching Authority regarding International Application No. PCT/US2008/011576 dated Mar. 20, 2009.

International Preliminary Report on Patentability for International Application No. PCT/US2008/011442, dated Apr. 7, 2010.

International Preliminary Report on Patentability for International Application No. PCT/US2008/011596, dated Apr. 13, 2010.

International Preliminary Report on Patentability for International Application No. PCT/US2008/011441, dated Apr. 7, 2010.

International Preliminary Report on Patentability for International Application No. PCT/US2008/011570, dated Apr. 13, 2010.

(56) References Cited

OTHER PUBLICATIONS

International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated 1/30/2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Non-Final Office Action regarding U.S. Appl. No. 12/246,825, dated Jan. 4, 2011.
Non-Final Office Action regarding U.S. Appl. No. 12/247,033, dated Jan. 21, 2011.
Non-Final Office Action regarding U.S. Appl. No. 12/247,001, dated Feb. 25, 2011.
Notification of the First Office Action from the State Intellectual Property Office of People's Republic of China regarding Chinese Application No. 200880110551.6, dated Feb. 11, 2011. Translation provided by Unitalen Attorneys At Law.
Non-Final Office Action regarding U.S. Appl. No. 12/246,893, dated Apr. 1, 2011.
Notification of First Office Action from the State Intellectual Property Office of People's Republic of China regarding Chinese Patent Application No. 200880110665.0, dated Apr. 8, 2011. Translation provided by Unitalen Attorneys At Law.
Notification of Grounds for Refusal regarding Korean Patent Application No. 10-2010-7006707, dated Oct. 23, 2012. Translation provided by Y.S. Chang & Associates.
Notice of Allowance and Fees Due regarding U.S. Appl. No. 12/247,020, dated Jan. 4, 2013.
Notice of Allowance and Fees Due regarding U.S. Appl. No. 12/246,927, dated Dec. 21, 2012.
Final Office Action regarding U.S. Appl. No. 12/246,959, dated Dec. 4, 2012.
Second Office Action from the State Intellectual Property Office of People's Republic of China regarding Chinese Patent Application No. 200880110785.0, dated Dec. 28, 2012. Translation provided by Unitalen Attorneys at Law.
Non-Final Office Action regarding U.S. Appl. No. 12/247,033, dated Jan. 29, 2013.
Notice of Allowance and Fee(s) Due regarding U.S. Appl. No. 12/246,959, dated Feb. 14, 2013.
Third Chinese Office Action from the State Intellectual Property Office of People's Republic of China regarding Chinese Patent Application No. 200880111091.9, dated Feb. 18, 2013. Translation provided by Unitalen Attorneys at Law.
Second Office Action from the State Intellectual Property Office of People's Republic of China regarding Chinese Patent Application No. 2008801110726, dated Mar. 15, 2013. Translation provided by Unitalen Attorneys at Law.
Notification of Final Rejection from Korean Intellectual Property Office regarding Korean Patent Application No. 10-2010-7006707, dated Apr. 2, 2013. Translation provided by Y.S. Chang & Associates.
Second Office Action from the State Intellectual Property Office of People's Republic of China regarding Chinese Patent Application No. 200880110616.7, dated Apr. 1, 2013. Translation provided by Unitalen Attorneys at Law.
European Search Report regarding Application No. 13161753.2-1602, dated Jul. 12, 2013.
Third Office Action from the State Intellectual Property Office of People's Republic of China regarding Chinese Patent Application No. 200880110616.7, dated Jul. 22, 2013. Translation provided by Unitalen Attorneys at Law.
Third Office Action from the State Intellectual Property Office of People's Republic of China regarding Chinese Patent Application No. 2008801110726, dated Sep. 12, 2013. Translation provided by Unitalen Attorneys at Law.
Fourth Office Action from the State Intellectual Property Office of People's Republic of China regarding Chinese Patent Application No. 200880110785.0, dated Oct. 21, 2013. Translation provided by Unitalen Attorneys at Law.
Office Action regarding U.S. Appl. No. 14/031,905, dated Dec. 13, 2013.
Decision of Rejection from the State Intellectual Property Office for People's Republic of China regarding Chinese Patent Application No. 200880110616.7, dated Nov. 27, 2013.
European Search Report regarding Application No. 08836902.0-1602/2198159 PCT/US2008011464, dated Apr. 4, 2014.
Second Office Action from the State Intellectual Property Office of People's Republic of China regarding Chinese Patent Application No. 201110371859.X, dated Jun. 23, 2014. Translation provided by Unitalen Attorneys at Law.
Final Office Action regarding U.S. Appl. No. 12/246,825, dated Jun. 14, 2011.
Final Office Action regarding U.S. Appl. No. 12/246,959, dated Oct. 12, 2011.
Final Office Action regarding U.S. Appl. No. 12/247,033, dated Jul. 12, 2011.
Final Office Action regarding U.S. Appl. No. 14/031,905, dated Jul. 23, 2014.
Non-Final Office Action regarding U.S. Appl. No. 12/247,033, dated Jan. 19, 2012.
Notification of Final Rejection regarding Korean Patent Application No. 10-2010-7007375, dated Apr. 3, 2012. Translation provided by Y.S. Chang & Associates.
Office Action regarding U.S. Appl. No. 12/436,825, dated Oct. 12, 2011.
Office Action regarding U.S. Appl. No. 12/246,959, dated Jun. 21, 2011.
Office Action regarding U.S. Appl. No. 12/244,387, dated Mar. 1, 2012.

(56) References Cited

OTHER PUBLICATIONS

Supplementary European Search Report regarding Application No. 08837095.2-1605/2195539 PCT/US2008011576, dated Nov. 25, 2014.
Extended European Search Report regarding Application No. 08837249.5-1605/2195540 PCT/US2008011589, dated Dec. 4, 2014.
Extended European Search Report regarding Application No. 08837777.5-1605/2198160 PCT/US2008011590, dated Dec. 3, 2014.
Extended European Search Report regarding Application No. 08837504.3-1605/2198218 PCT/US2008011597, dated Dec. 3, 2014.
Extended European Search Report regarding Application No. 08838154.6-1605/2195588 PCT/US2008011593, dated Dec. 4, 2014.
Extended European Search Report regarding Application No. 08836944.2-1605/2198165 PCT/US2008011596, dated Dec. 4, 2014.

* cited by examiner

COMPRESSOR ASSEMBLY HAVING ELECTRONICS COOLING SYSTEM AND METHOD

FIELD

The present disclosure relates to a compressor system that utilizes refrigerant to cool system electronics.

BACKGROUND

The statements in this section merely provide background information related to the present disclosure and may not constitute prior art.

A compressor may use electronics to control the compressor motor. The electronics may be externally mounted to the outer shell of the compressor, and used to modulate compressor capacity, such as by varying the speed of the motor. During operation, however, the electronics may generate heat. If too much heat is generated, the electronics may overheat.

SUMMARY

The present disclosure provides a system including a compressor having a suction side for receiving low-pressure refrigerant and a discharge side for dispensing high-pressure refrigerant. A pair of heat exchangers are in communication with the compressor, and an expansion valve is disposed between the heat exchangers. A temperature sensor detects a temperature of the low-pressure refrigerant passing through the system, and a cooling apparatus receives the low-pressure refrigerant. An electronics module is adjacent the cooling apparatus, in communication with the temperature sensor, and controls the expansion valve based on the temperature of the low-pressure refrigerant to control an amount of the low-pressure refrigerant passing through the cooling apparatus.

In the system described above, the electronics module controls a liquid dry out point (LDOP) of the low-pressure refrigerant.

Also, the electronics module controls superheating of the low-pressure refrigerant.

In the system described above, if the sensor detects a decrease in temperature of the low-pressure refrigerant, the electronics module causes the expansion valve to decrease an amount of refrigerant allowed to reach one of the heat exchangers.

If the sensor detects an increase in temperature of the low-pressure refrigerant, the electronics module causes the expansion valve to increase an amount of refrigerant allowed to reach one of the heat exchangers.

The temperature sensor may be disposed adjacent the cooling apparatus.

Alternatively, the temperature sensor may be disposed at an inlet of the cooling apparatus.

In yet another alternative, the temperature sensor is disposed downstream of an inlet of the cooling apparatus.

The cooling apparatus may include a cold plate having a plurality of passageways for carrying the low-pressure refrigerant.

Moreover, the compressor may be a variable speed compressor.

Further, the electronics module may include an inverter.

The present disclosure also provides a compressor for an air conditioning system or a heat pump system carrying a refrigerant. The compressor includes a shell including a suction line for receiving low-pressure refrigerant and a discharge line for dispensing high-pressure refrigerant. An electronics module is proximate the shell, and a cooling apparatus is proximate the electronics module that utilizes the low-pressure refrigerant to cool the electronics module. A temperature sensor is adjacent the cooling apparatus and in communication with the electronics module, and detects a temperature of the low-pressure refrigerant.

In the compressor described above, the cooling apparatus may include a cold plate having a plurality of passageways for carrying the low-pressure refrigerant.

In addition, the sensor may be located at an inlet to the cooling apparatus.

Alternatively, the temperature sensor may be disposed downstream of an inlet of the cooling apparatus.

In the compressor described above, the electronics module controls an amount of the refrigerant passing through the cooling apparatus.

If the sensor detects a decrease in temperature of the low-pressure refrigerant, the electronics module decreases an amount of low-pressure refrigerant passing through the cooling apparatus.

If the sensor detects an increase in temperature of the low-pressure refrigerant, the electronics module increases an amount of low-pressure refrigerant passing through the cooling apparatus.

The electronics module also controls a liquid dry out point (LDOP) of the refrigerant.

In addition, the electronics module controls superheating of the low-pressure refrigerant.

Moreover, the electronics module may vary a speed of the compressor.

Further, the electronics module may include an inverter.

The present disclosure also provides a method that includes monitoring a temperature of a low-pressure refrigerant with a temperature sensor in communication with an electronics module. The electronics module controls a flow of the low-pressure refrigerant based on the temperature, and the electronics module is cooled with the low-pressure refrigerant.

In the method, controlling the flow controls a liquid dry out point (LDOP) of the low-pressure refrigerant.

Moreover, controlling the LDOP controls superheating of the low-pressure refrigerant.

If the sensor detects a decrease in temperature of the low-pressure refrigerant, the electronics module decreases the flow of low-pressure refrigerant.

If the sensor detects an increase in temperature of the low-pressure refrigerant, the electronics module increases the flow of low-pressure refrigerant.

In addition, the electronics module may include an inverter.

The method may also include compressing the refrigerant with a variable speed compressor.

The present disclosure also provides a system including a compressor that discharges a high-pressure refrigerant. A pair of heat exchangers are in communication with the compressor. An expansion valve is disposed between the heat exchangers that converts the high-pressure refrigerant to a low-pressure refrigerant, and an electronics module controls the expansion valve. A temperature sensor is in communication with the module for detecting a temperature of the low-pressure refrigerant. A cooling apparatus is adjacent the temperature sensor for cooling the module with the low-pressure refrigerant, wherein if the sensor detects a decrease in temperature of the low-pressure refrigerant, the electronics module causes the expansion valve to decrease an amount of low-pressure refrigerant allowed to pass therethrough and, if the sensor detects an increase in temperature of the low-pressure refrigerant, the electronics module causes the expansion valve to increase an amount of low-pressure refrigerant allowed to pass therethrough.

In the above system, increasing and decreasing the refrigerant with the expansion valve controls a liquid dry out point (LDOP) of the refrigerant.

In addition, controlling the LDOP controls superheating of the low-pressure refrigerant.

In the system, the sensor may be disposed at an inlet of the cooling apparatus.

Alternatively, the sensor may be disposed downstream of an inlet of the cooling apparatus.

In the system, the compressor may be a variable speed compressor.

In addition, the electronics module may include an inverter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
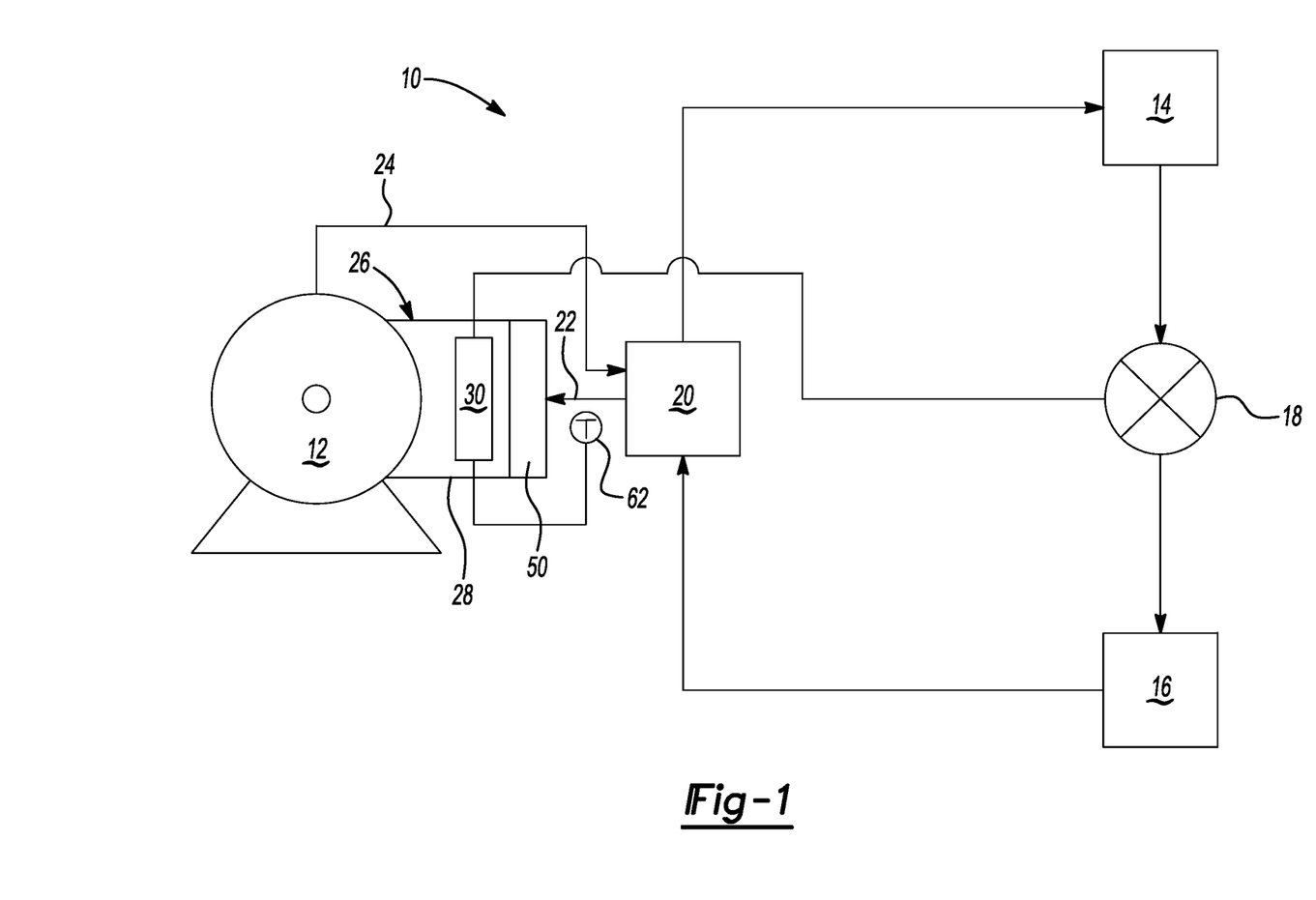
FIG. 1 is a schematic representation of an air conditioning or heat pump system.

FIG. 1 is a schematic representation of an air conditioning or heat pump system 10. Air conditioning or heat pump system 10 may generally include a compressor 12, a condenser 14, and an evaporator 16. Disposed between condenser 14 and evaporator 16 may be an expansion valve 18. Air conditioning or heat pump system 10 may also be provided with a reversing valve 20 where suction and discharge lines 22 and 24, respectively, pass through. Reversing valve 20 allows system 10 to operate as either a refrigeration system or a heat pump. Regardless whether system 10 operates as a refrigeration system or as a heat pump, compressor 12 receives low-pressure refrigerant at a suction side and dispenses high-pressure refrigerant at a discharge side.

When operating as a refrigeration system, system 10 uses the cooling effect of evaporation of the refrigerant to lower the temperature of the surroundings near one heat exchanger (i.e., evaporator 16) and uses the heating effect of high pressure, high temperature gas to raise the temperature of the surroundings near another heat exchanger (i.e., condenser 14). This is usually accomplished by releasing a refrigerant under pressure (usually in a liquid phase) into a low pressure region to cause the refrigerant to expand into a low temperature mixture of liquid and vapor. Commonly, this low pressure region comprises a coil (not shown) that acts as an evaporator, that may be formed in evaporator 16. Once in the evaporator coil, the refrigerant mixture may exchange heat with the tubing of the coil, which in turn exchanges heat with high temperature ambient air of the region desired to be cooled. Evaporation of refrigerant from liquid to gas absorbs heat from the ambient air and thereby cools it.

Release of refrigerant into the low pressure evaporator coil is usually metered by expansion valve 18. There are a wide variety of different types of expansion valves in use today, ranging from simple non-adjustable capillary tubes or orifices to electrically adjustable valves, such as pulse width modulated valves and stepper motor valves.

The refrigerant at the output of evaporator 16 is compressed back into a high pressure state by compressor 12 and is condensed into a liquid phase by condenser 14 so that it may be used again. In some systems, compressor 12 may be variable speed or variable capacity, so that the compressor 12 also controls the rate at which refrigerant flows through the restricted orifice. To operate compressor 12 at variable speed or variable capacity, compressor 12 may include an electronics module 26, including an electronic inverter.

Electronic inverter, which may also be referred to as a variable frequency drive (VFD), receives electrical power from a power supply and delivers electrical power to compressor 12. By modulating the frequency of electrical power delivered to the electric motor of compressor 12, inverter may thereby modulate and control the speed, and consequently the capacity, of compressor 12. To modulate the frequency of electric power, inverter may include solid state electronics to modulate the frequency of electrical power. Generally, inverter more specifically comprises a converter that converts the inputted electrical power from AC to DC, and then inverter converts the electrical power from DC back to AC at a desired frequency.

Figure 2:
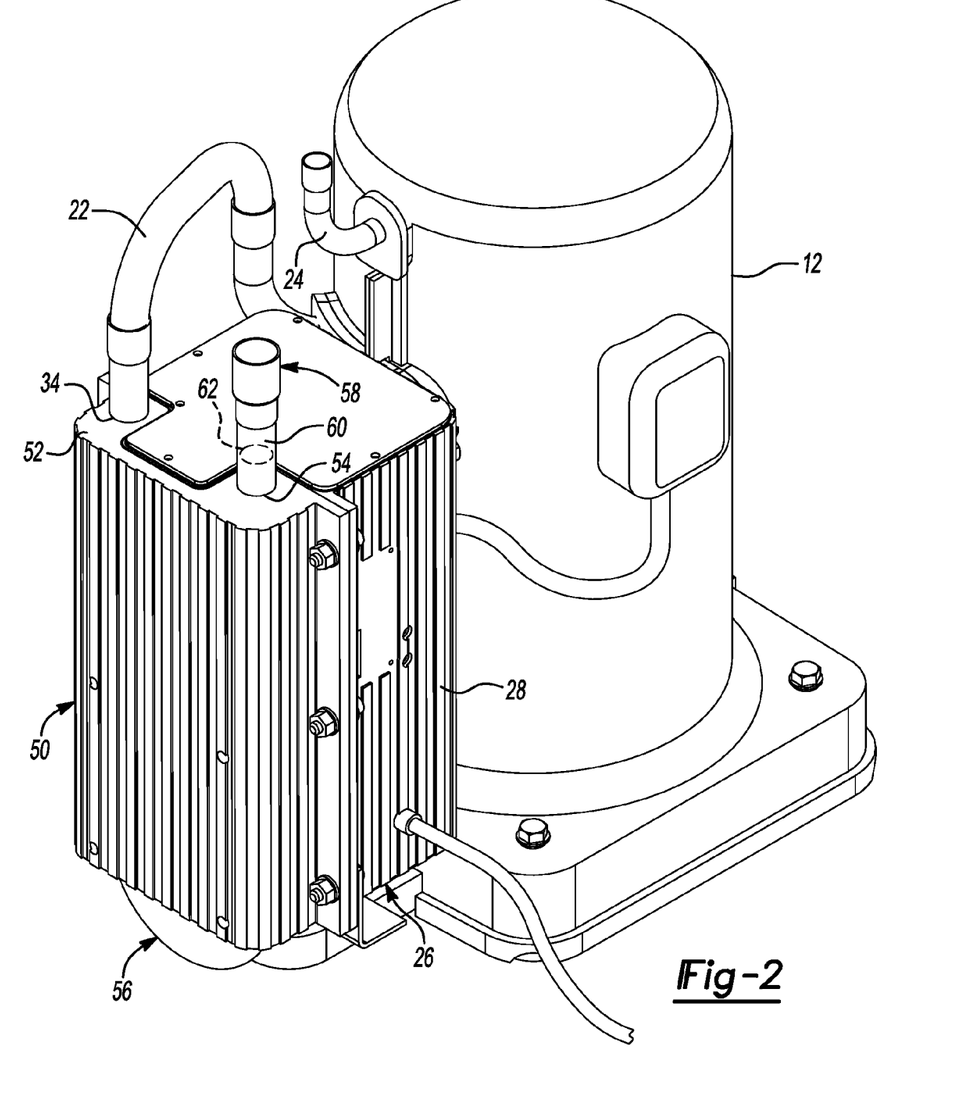
FIG. 2 is a perspective view of a compressor and its corresponding electronics module having a cooling apparatus.

FIG. 2 illustrates an exemplary compressor 12 having electronics module 26 mounted thereto. Electronics module 26 includes an electrical enclosure or housing 28 that houses various electronic components such as a control module 30. Control module 30, such as Assignee's U.S. Pat. No. 6,302,654, which is hereby incorporated by reference in its entirety, may control compressor capacity or monitor operating conditions of the compressor.

Control module 30 may generally include a control block, microprocessor, memory analog-to-digital converters, a communication interface, the inverter described above, and a plurality of terminals connected to various sensors that monitor parameters of the compressor. The control block, which includes processing circuitry, may control compressor capacity. The analog-to-digital converter may be used to convert analog signals sent by the various sensors to a digital signal before input into control module 30. The communication interface may provide communication with the control block from an outside source or server via, for example, an internet or intranet connection.

Electronics module 26 may also house a compressor protection or diagnostic system that may include controller 30, such as that described above, and a power interruption system (not shown). Diagnostic system may include a plurality of sensors, and diagnoses operating conditions by receiving and analyzing motor, compressor, and system parameters. In addition, the diagnostic data may be used to control compressor modulation based on system conditions detected by the sensors. An exemplary compressor protection and control diagnostic systems is described in the assignee's commonly owned U.S. patent application Ser. No. 11/059,646 filed on Feb. 16, 2005, and U.S. Pat. No. 6,615,594 which are hereby incorporated by reference in their entirety.

As system 10 operates, the components of electronics module 26 may generate heat. As more heat is generated, however, the components (e.g., inverter components) of electronics module 26 may overheat and cause system 10 to either shutdown or reduce capacity until the components cool, or the components may not operate correctly and cause system 10 to malfunction or fail. To reduce the possibility that the components of electronics module 26 may fail due to overheating, steps may be taken to cool electronics module.

Again referring to FIG. 2, a cooling apparatus 50 may be mounted to electronics module 26 to cool electronics module 26. Cooling apparatus 50 may be a cold plate that may include a generally planar member 52 that includes a plurality of pathways 54. The pathways 54 are configured to support a tubular assembly 56 that carries the refrigerant therein. Refrigerant passing through tubular assembly 56 and planar member 52 absorbs heat generated by the electronics module 26 that is passed from the electronics assembly 26 to planar member 52. In this manner, heat generated by the electronics module 26 may be efficiently transferred to the refrigerant (i.e., a suction gas) flowing through the cooling apparatus 50 to cool electronics module 26.

At an inlet 58 of cooling apparatus 50 within a suction line 60 from system 10 may be disposed a temperature sensor 62. Although temperature sensor 62 is illustrated as being disposed upstream at inlet 58 in FIG. 2, the present disclosure should not be limited thereto. Temperature sensor 62, rather, may be disposed upstream of inlet 58, adjacent inlet 58, or downstream of inlet 58 within cooling apparatus 50. Regardless, temperature sensor 62 senses a temperature of the suction line 60 refrigerant, indicating conditions prior to or after the refrigerant enters cooling apparatus 50, and communicates temperatures of the refrigerant in suction line 60 to electronics module 26. Fluctuations in temperature of the refrigerant detected by temperature sensor 62 and communicated to electronics module 26 may by used to control expansion valve 18 to either increase or decrease the amount of refrigerant entering evaporator 16. That is, electronics module 26 is also in communication with expansion valve 18 to control an amount of refrigerant entering evaporator 16 through expansion valve 18. By controlling expansion valve 18 based on a temperature of the refrigerant detected by temperature sensor 62, the amount of refrigerant entering evaporator 16 may be controlled to enhance the cooling effect of cooling apparatus 50 on electronics module 26.

Figure 3:
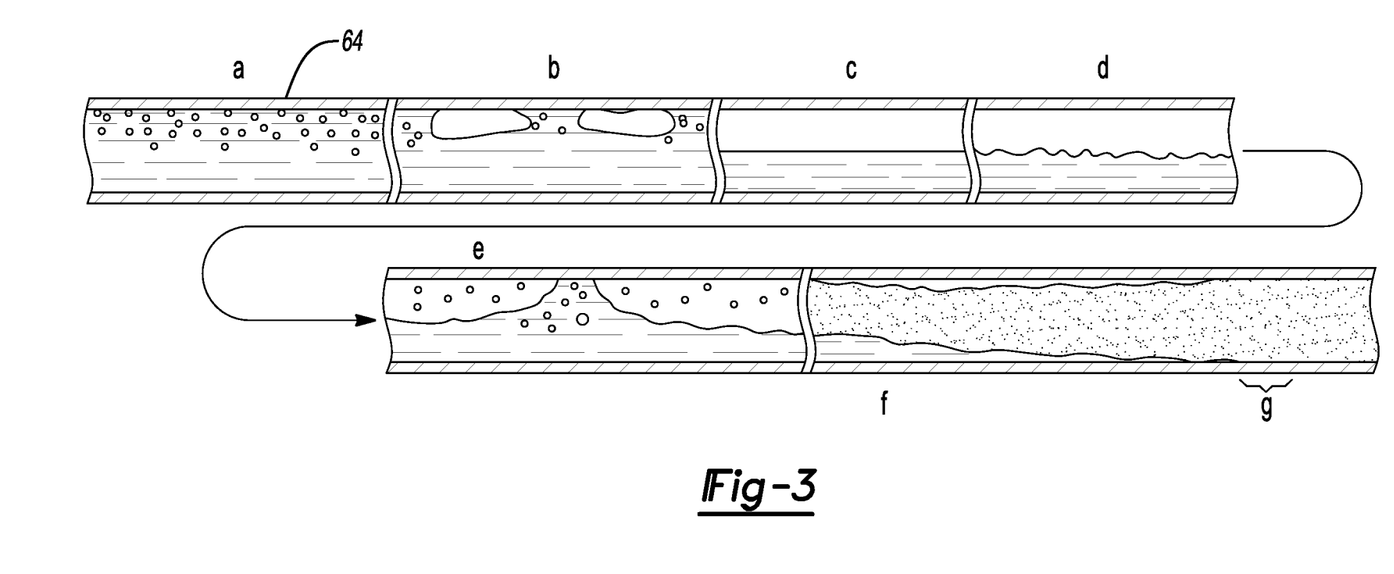
FIG. 3 is a cross-sectional view of a conduit in the air conditioning or heat pump system, illustrating the transition of the refrigerant from a liquid phase to a gaseous phase.

Furthermore, by controlling expansion valve 18, a liquid dry out point (LDOP) of the refrigerant in system 10 may be controlled. LDOP is described in assignee's U.S. Pat. No. 5,502,970, which is hereby incorporated by reference in its entirety. LDOP operates on a principle that a refrigerant flow pattern develops as the refrigerant acquires heat in the coils 64 of evaporator 16 and ultimately makes a transition from liquid to vapor. Referring to FIG. 3, a section of the evaporator coil 64 of evaporator 16 is illustrated. Specifically, a portion adjacent to an exit end of coil 64 has been illustrated, in magnified form, to show how the refrigerant changes state as heat is absorbed.

In Region a, the refrigerant is principally in the liquid phase with some suspended bubbles of refrigerant in the vapor phase. The bubbles tend to flow along the top of the coil, as illustrated. As heat is absorbed, the refrigerant gradually exhibits the flow illustrated in Region b. In Region b, bullet-shaped bubbles form and tend to move along the top of the coil as illustrated.

As the flow proceeds to Region c, the refrigerant enters a stratified flow regime, characterized by liquid refrigerant flowing along the bottom of the coil and vapor refrigerant flowing along the top. As further heat energy is absorbed by the refrigerant, the liquid refrigerant develops waves that are depicted in Region d. These waves are formed on the liquid/vapor interface through the increased velocity of the vaporous refrigerant.

Next, the slug flow regime develops as illustrated in Region e. The waves and the liquid refrigerant grow large enough to touch the upper surface of the coil, with large frothy slugs of liquid interspersed with regions of stratified liquid flow. Finally, in Region f virtually all of the refrigerant is in the vapor phase and the flow become annular. The liquid refrigerant adheres to the sidewall of the coil with a greater quantity present at a bottom of a coil due to gravitational effect.

The LDOP or "burn out" point occurs when the liquid phase adhering to the sidewalls substantially disappears. The LDOP is illustrated generally at Region g in FIG. 3. The precise location of the LDOP, however, will shift randomly or erratically back and forth (i.e., left to right in FIG. 3) as system 10 operates.

Utilizing the LDOP concept, sensor 62 is disposed at a location adjacent inlet 58 of cooling apparatus 50 so that if a minimum amount of liquid refrigerant advances to the location of sensor 62 (i.e., the LDOP moves downstream of sensor 62 towards cooling apparatus 50), a sudden change of temperature may be detected by sensor 62 (because liquid refrigerant generally has a temperature less than gaseous refrigerant). If such a change in temperature is detected by sensor 62 and communicated to electronics module 26, electronics module 26 may then communicate with expansion valve 18 to reduce the amount of refrigerant flowing to evaporator 16. Reducing the amount of refrigerant flowing to evaporator 16 may move the LDOP upstream of sensor 62.

In contrast, when the temperature of the refrigerant detected by sensor 62 increases, indicating that the LDOP is upstream of sensor 62, expansion valve 18 may be controlled by electronics module 26 to increases the flow of the refrigerant to evaporator 16 to move the LDOP back downstream towards sensor 62. In this manner, the refrigerant flow may be controlled through evaporator 16 to control the LDOP by controlling expansion valve 18. By controlling the LDOP such that the LDOP is essentially at the location of sensor 62, a minimum amount of liquid refrigerant may enter cooling apparatus 50.

Controlling expansion valve 18 based on fluctuation of the LDOP also allows for minimum superheating of the refrigerant, which improves performance of the heat exchange surface of evaporator 16. This, in turn, enables the size of evaporator 16 to be minimized. Furthermore, due to the minimum superheating of the refrigerant, lower temperature cooling of the electronic module 26 may be achieved. This lower temperature cooling of electronics module 36, compared to using condensed liquid as used in conventional refrigerant systems, may result in lower cost electronics. Moreover, controlling expansion valve 18 so that the LDOP stays upstream of cooling apparatus 50 minimizes temperature fluctuations experienced by electronics module 26.

Additionally, condensation that may form on electronics module 26 and cooling apparatus 50 may be kept minimal since electronics module 26 may be cooled in accordance with operation of compressor 12. That is, as capacity of compressor 12 increases, operation of expansion valve 18 may be controlled to maximize the amount of refrigerant entering evaporator 16 and cooling apparatus 50 to cool electronics module 26.

Using LDOP also enables cooling apparatus 50 to be sized such that minimization of electronics module 26 is possible by ensuring lower solid-state electronic component (not shown) junction temperature. Electronics module 26 used by system 10 may have electronic components with a maximum current rating limited by its junction temperature, $T_J$. In general, $T_J$ should not exceed 160 degrees C. and, generally, $T_J$ is about 150 degrees C. at a given solid-state packaging case temperature, $T_C$. Case temperature affects the maximum current rating of the solid-state switch. For example, the solid-state switches may be rated at 60 amperes at a $T_C$ of 25 degrees C. and rated at 30 amperes at a $T_C$ of 100 degrees C. This difference in current rating results from thermal resistance at the junction of the solid-state switch and its packaging.

A $T_C$ of 25 degrees Celsius may not be obtained at full current rating using only forced convection of air on a typical heat sink in contact with the packaging case, let alone by using natural convection. $T_C$ of 100 degrees C., however, is more readily observed using these methods and, therefore, current ratings of about 30 amperes are generally achieved using forced convection and natural convection of air on a heat sink with contact with the packaging case. By using refrigerant cooling and controlling the LDOP by controlling the expansion valve 18, however, the amount of cooling that cooling apparatus 50 may exhibit on electronics module 26 and housing 28 may extend the current rating to about 39 amperes (i.e., a 30 percent increase). That is, cooling apparatus 50 having gaseous refrigerant passing therethrough based on controlling the LDOP results in a lower electronic component junction temperature that allows solid-state switch, and therefore electronics module 26, to operate at a higher current rating. Because the current rating may be raised in this manner, the cost of running system 10 may be reduced, and the cost of the electronics used for electronics module 26 may be reduced The above description is merely exemplary in nature and, thus, variations that do not depart from the gist of the disclosure are intended to be within the scope of the present teachings. Such variations are not to be regarded as a departure from the spirit and scope of the present teachings.

What is claimed is:

1. A system comprising:
   a compressor having a suction side for receiving low-pressure refrigerant and a discharge side for dispensing high-pressure refrigerant;
   a pair of heat exchangers in communication with said compressor;
   an expansion valve disposed between said heat exchangers;
   a control module for controlling said expansion valve;
   an electronics module externally mounted to the compressor;
   a cooling apparatus mounted to the electronics module that receives said low-pressure refrigerant to cool said electronic module;
   a temperature sensor located at an inlet of said cooling apparatus, said temperature sensor for detecting a temperature of said low-pressure refrigerant entering said cooling apparatus,
   wherein said control module is in communication with said temperature sensor, and controls said expansion valve based on said temperature of said low-pressure refrigerant to minimize an amount of said low-pressure refrigerant in a liquid phase passing through said cooling apparatus.

2. The system of claim 1, wherein said control module controls a liquid dry out point (LDOP) of said low-pressure refrigerant.

3. The system of claim 1, wherein said control module controls superheating of said low-pressure refrigerant.

4. The system of claim 1, wherein if said sensor detects a decrease in temperature of said low-pressure refrigerant, said control module causes said expansion valve to decrease an amount of refrigerant allowed to reach one of said heat exchangers.

5. The system of claim 1, wherein if said sensor detects an increase in temperature of said refrigerant, said control module causes said expansion valve to increase an amount of refrigerant allowed to reach one of said heat exchangers.

6. A compressor for an air conditioning system or a heat pump system carrying a refrigerant, comprising:
   a shell including a suction line for receiving low-pressure refrigerant and a discharge line for dispensing high-pressure refrigerant;
   an electronics module externally mounted to said shell;
   a cooling apparatus mounted to said electronics module that utilizes said low-pressure refrigerant to cool said electronics module;
   a control module; and
   a temperature sensor at an inlet of said cooling apparatus for detecting a temperature of said low-pressure refrigerant entering said cooling apparatus, said temperature sensor being in communication with said control module, and said control module minimizing an amount of said low-pressure refrigerant in a liquid phase passing through said cooling apparatus to cool said electronics module based on said temperature.

7. The compressor of claim 6, wherein if said sensor detects a decrease in temperature of said low-pressure refrigerant, said control module decreases an amount of low-pressure refrigerant passing through said cooling apparatus.

8. The compressor of claim 6, wherein if said sensor detects an increase in temperature of said low-pressure refrigerant, said control module increases an amount of low-pressure refrigerant passing through said cooling apparatus.

9. The compressor of claim 6, wherein said control module controls a liquid dry out point (LDOP) of the refrigerant.

10. The compressor of claim 6, wherein said control module controls superheating of said low-pressure refrigerant.

11. A method comprising cooling an electronics module that is externally mounted to a compressor using a cooling apparatus mounted to said electronics module with a low-pressure refrigerant that passes through said cooling apparatus, said step of cooling including monitoring a temperature of said low-pressure refrigerant with a temperature sensor located at an inlet of said cooling apparatus, said temperature sensor being in communication with a control module that minimizes a flow of said low-pressure refrigerant in a liquid phase entering said cooling apparatus based on said temperature.

12. The method of claim 11, wherein controlling said flow controls a LDOP of said low-pressure refrigerant.

13. The method of claim 12, wherein controlling said LDOP controls superheating of said low-pressure refrigerant.

14. The method of claim 11, wherein if said sensor detects a decrease in temperature of said low-pressure refrigerant, said control module decreases said flow of low-pressure refrigerant.

15. The method of claim 11, wherein if said sensor detects an increase in temperature of said low-pressure refrigerant, said control module increases said flow of low-pressure refrigerant.

16. A system comprising:
   a compressor that discharges a high-pressure refrigerant;
   a pair of heat exchangers in communication with said compressor;

an expansion valve disposed between said heat exchangers that converts said high-pressure refrigerant to a low-pressure refrigerant;

a control module for controlling said expansion valve;

an electronics module externally mounted to said compressor;

a cooling apparatus mounted to said electronics module for cooling said electronics module with said low-pressure refrigerant; and a temperature sensor located directly adjacent an inlet of said cooling apparatus for detecting a temperature of said low-pressure refrigerant entering said cooling apparatus to cool said electronics module, wherein if said sensor detects a decrease in temperature of said low-pressure refrigerant entering said cooling apparatus, said control module causes said expansion valve to decrease an amount of low-pressure refrigerant allowed to pass therethrough;

wherein if said sensor detects an increase in temperature of said low-pressure refrigerant entering said cooling apparatus, said control module causes said expansion valve to increase an amount of low-pressure refrigerant allowed to pass therethrough; and said control module minimizes said low-pressure refrigerant in a liquid phase passing through said cooling apparatus.

17. The system of claim 16, wherein increasing and decreasing said refrigerant with said expansion valve controls a LDOP of said refrigerant.

18. The system of claim 17, wherein controlling said LDOP controls superheating of said low-pressure refrigerant.

19. The system of claim 16, wherein said compressor is a variable speed compressor.

20. The system of claim 16, wherein said electronics module includes an inverter.

* * * * *